UNITED STATES PATENT OFFICE.

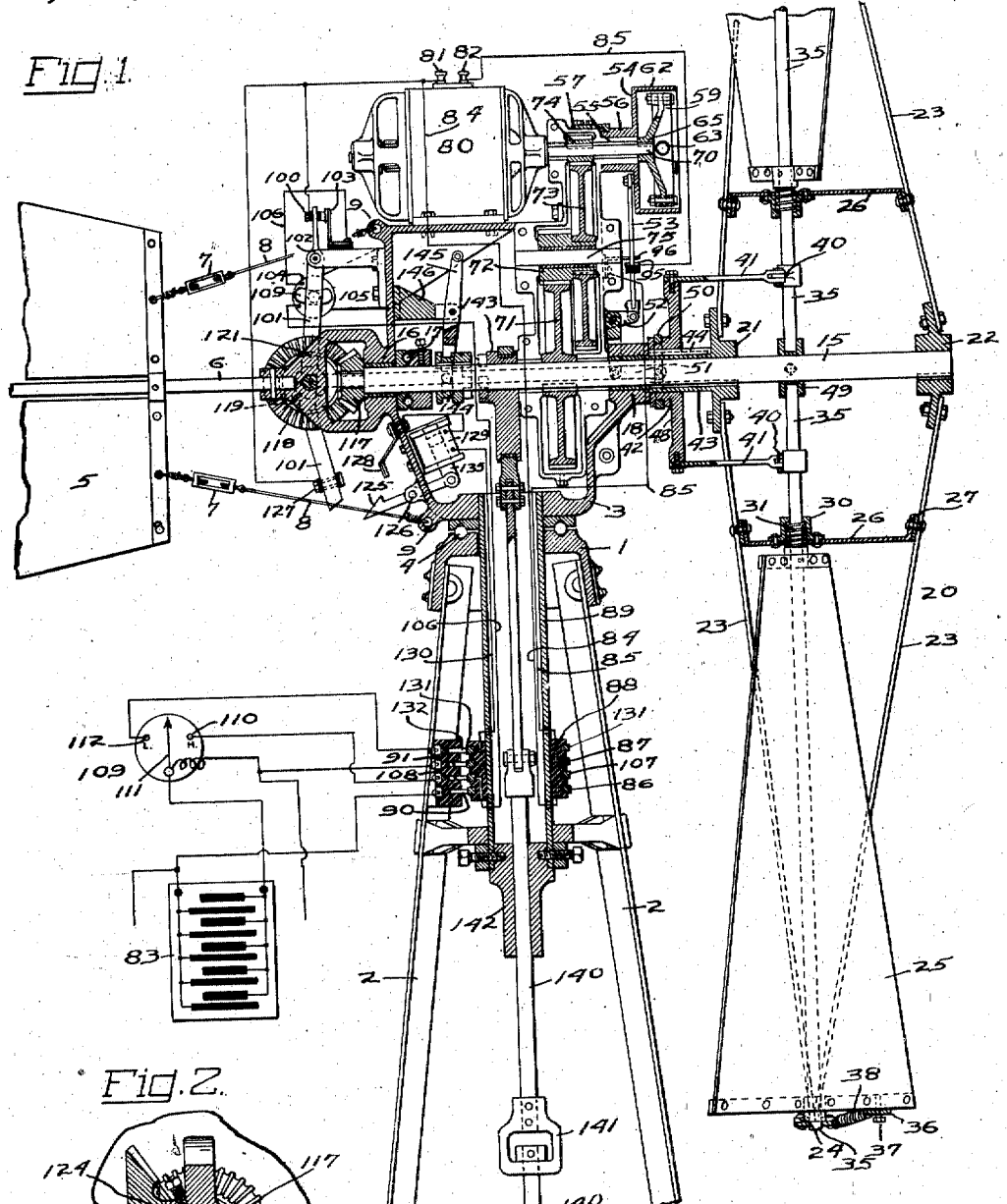

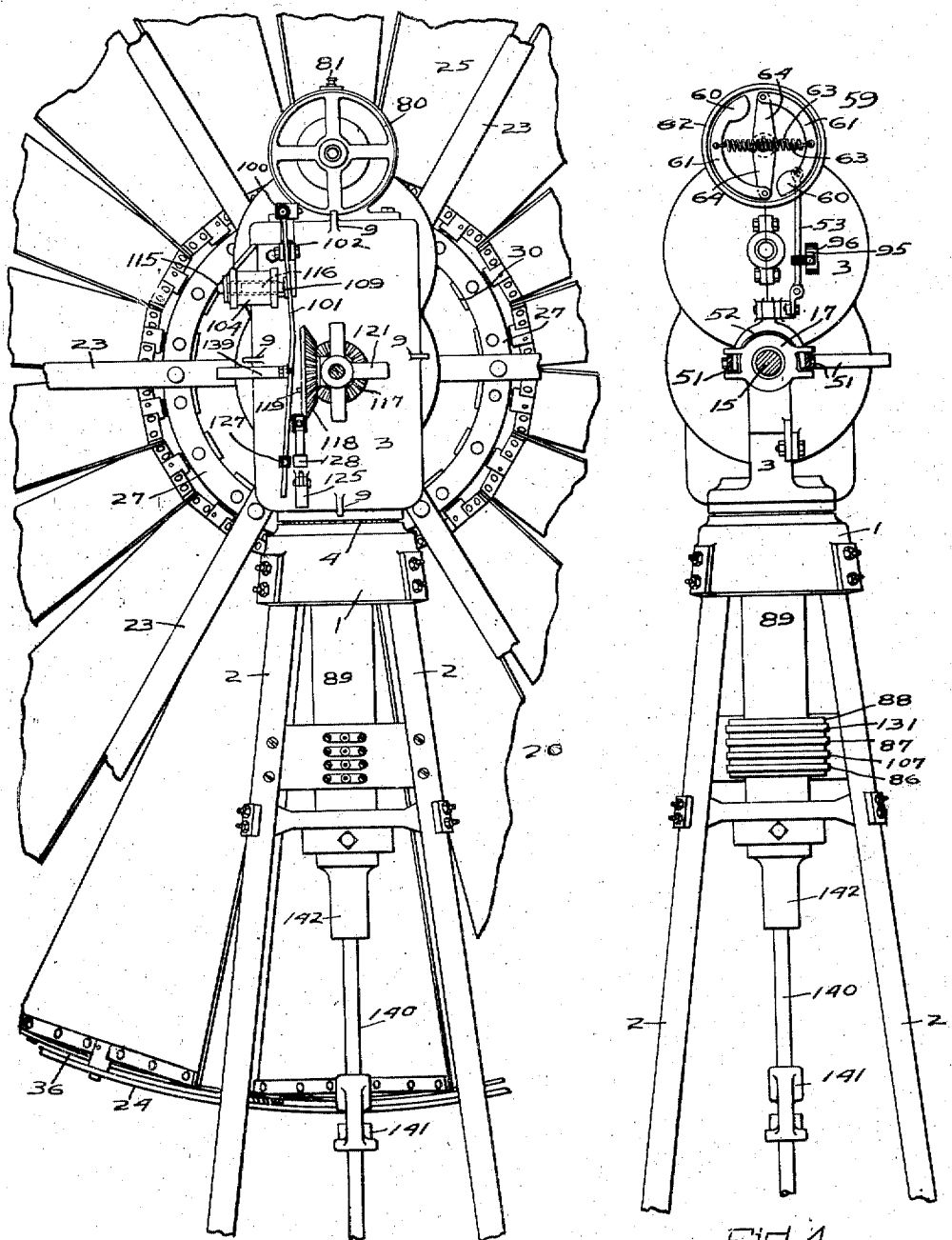

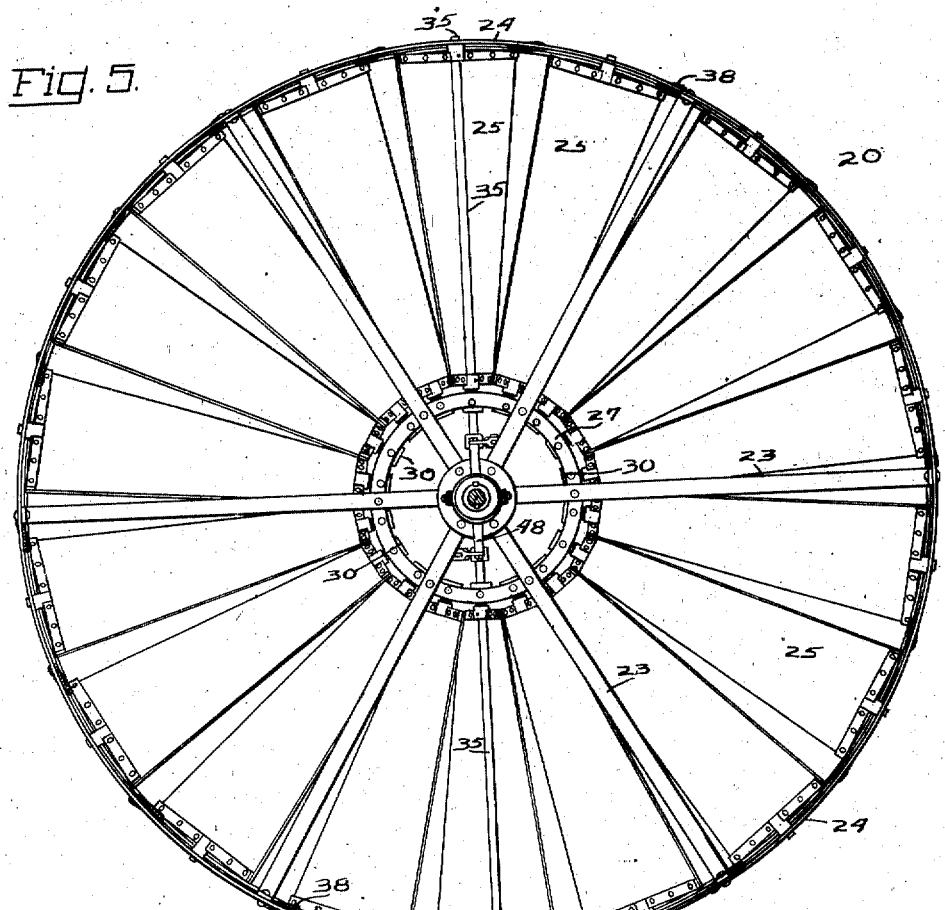
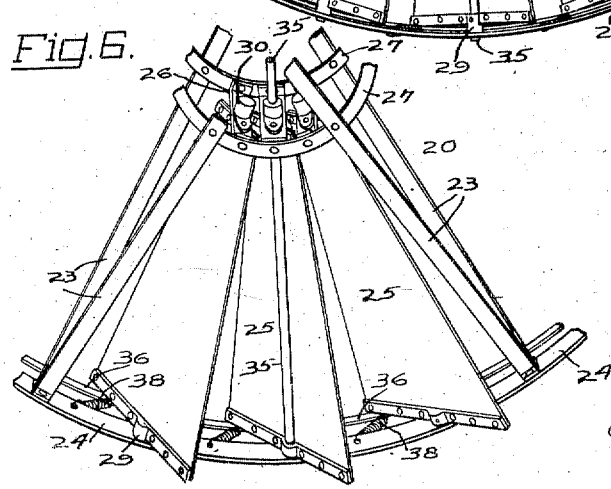

FRED J. FAHLE, OF LUCKEY, OHIO.

WINDMILL-GENERATOR SET.

1,255,998.  Specification of Letters Patent.  Patented Feb. 12, 1918.

Application filed July 22, 1915. Serial No. 41,348.

*To all whom it may concern:*

Be it known that I, FRED J. FAHLE, a citizen of the United States, and a resident of Luckey, in the county of Wood and State of Ohio, have invented a certain new and useful Windmill-Generator Set; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to means for generating an electric current by the operations of a windmill. The invention particularly relates to means for driving a generator at a high speed and to intercontrolling means whereby the speed of the generator shall be at all times above a certain minimum and also means whereby the speed of the generator will be substantially constant. Generators of the type commonly used are wound to produce most efficient results when the speed of the armature is substantially constant. By my invention the wheel of the mill moves at substantially a constant speed when the circuit of the generator is completed.

The generator used in connection with the construction may be used for supplying a current for any form of a suitable electric translating device or system. My invention is particularly applicable to charging a storage battery from which the current may be drawn as may be desired and used for any purpose for which such a current may be used, such as for motors, or electric lights, etc. By my invention is thus provided a means whereby the electricity will be stored at all times while the wind is blowing sufficient to cause generation of the proper potential and the current thus stored may be drawn upon as may be desired for the operation of a number of translating devices. The generator is connected to the mill by means which will cause the armature to move at a high rate thus requiring considerable power to drive it. If the wind is not strong enough it will not be operated.

Also by my invention is provided a means whereby the generator will be operated only when the storage battery is not charged to its maximum amount and also whereby, when it is so charged, the mill will be so manipulated that it will not operate and the generator will be cut out of the circuit of the storage battery to prevent short circuiting through the armature of the generator when the armature is not rotated by the operation of the windmill. By my invention is thus provided a means whereby a substantially constant potential will be impressed upon the storage battery and which will not be discharged by the counter electromotive force of the battery due to the reduction of the electromotive force of the generator which would otherwise be caused by the reduction of speed of the generator or the cessation of movement of the armature when connected with the storage battery.

Also, by my invention, is provided a means for connecting the generator with the storage battery when the speed of the mill is sufficient to make the generator produce the desired potential for charging the storage battery and to automatically disconnect the generator when the shaft of the windmill falls below the lower rate limit at which the generator should run in order that it may charge the storage battery. Whereupon, the connection to the storage battery will be opened to prevent short circuiting on the storage battery through the armature of the generator.

The invention may be contained in many forms of constructions usable for different purposes, all of which come within the purview of my claims hereinafter appended. For purposes of illustration, I have selected one of such constructions and will describe the manner in which it may be constructed and the operation thereof. The structure selected is illustrated in the accompanying drawings.

Figure 1 of the drawings illustrates a vertical sectional view of the windmill generator set, partly broken in order that the construction may be clearly illustrated within the limitations of the drawing. Fig. 2 illustrates gear mechanism whereby the blades of the windmill may be placed in line with the direction of the wind to stop the rotation of the windmill. Fig. 3 illustrates a rear view of the windmill, the rudder being shown removed. Fig. 4 illustrates a front view of a part of blade operating mechanism. Fig. 5 illustrates a rear view of the wheel. Fig. 6 is a perspective view showing some of the blades of the wheel, and the manner in which they are mounted.

1, Fig. 1, is the upper end or head of the tower having the tower posts 2 on which the windmill and other parts of the structure embodying my invention, is supported. The tower is provided with a rotatable housing or supporting frame 3 which is pivotally supported on the upper end 1 of the tower. It may be supported on the ball bearing 4 for ease of rotation of the housing 3 in response to the change in direction of the wind. The housing 3 is rotated by the operation of the wind upon the rudder 5. The rudder 5 is supported on the laterally extending rod 6 which is secured on the rear end of the housing 3. It also may be braced by suitable turn-buckles 7 and stay wires 8 which are secured at their ends in eyes 9 formed in the housing 3.

The main windmill shaft 15 is also supported in the housing 3. The shaft 15 is supported in bearings 16 and 18 located at the rear and front of the housing 3. The shaft 15 is provided with an end thrust ball bearing 17. To the front end of the shaft 15 is secured the wheel 20. It is keyed to the shaft 15 by means of collars 21 and 22 and is suitably braced by means of the tie rods 23 which are bolted to the collars 21 and 22 and to the ring 24 which extends peripherally around the wheel.

The blades 25 are pivotally supported in the ring 24 and in cross bars 26 which are bolted to the rings 27. The rings 27 are also secured to the tie rods 23 by means of rivets or bolts as may be desired, as best shown in Fig. 6. The blades 25 are pivotally supported on pins 28 which extend into sockets 29 formed in the ends of the blades 25. They are also pivotally supported at their inner ends in sockets 30 which are supported on the cross bars 26. The sockets 30 are also provided with springs 31 which take up any looseness which may exist between the blades and the frame of the wheel and also keep the blade 25 pressed outwardly against the ring 24 and thus prevent any rattling in the rotation of the wheel and while the blades are passing from the uppermost to the lowermost positions relative to the main shaft 15. The springs 31 are located intermediate the bottom of the sockets 30 and the inner ends of the blades 25.

Two shafts 35 extend radially from the main shaft 15. They are pivoted in two sockets 30 and also in the ring 24, as shown in Fig. 5, and in collar 49. The shafts 35 are secured to two of the blades 25. A ring 36 extends around the wheel and is movable relative to the shaft 15. The ring 36 is located at one side of the ring 24. The ring 36 is provided with a plurality of pins 37 which extend into the blades 25. One or more springs, preferably, a plurality of springs 38, connect the rings 24 and 36. As the blades 25 are shifted in their angular position relative to the direction of the wind by the movements of the shafts 35, that is, in the direction of the axis of the shaft 15, the ring 36 is rotated a short angular distance about the shaft 15 causing all of the blades to make like angular movements relative to the direction of the wind. The springs 38 located intermediate and secured to the rings 24 and 36, yieldingly tend to draw the blades 25 so as to place the blades at an angle to the direction of the wind to obtain maximum efficiency of the windmill. This may be at an angle of 45°. The shafts 35 being keyed to two of the blades 25 when rotated, operate against the tension of the springs 38 to turn the blade from the 45° relation to a lesser angle according to the operations of the parts of the structure hereinafter described.

The shafts 35 are provided with two arms 40 which extend laterally and substantially in the plane of the wheel. Links 41 are connected to the ends of the arms 40. A collar 42 is feathered to the wheel, it being secured by means of a feather 44 to the collar 21, the collar 21 being provided with a hub or sleeve 43 which extends rearwardly over which the collar 42 may slide. The collar 42 is provided with arms 48. The links 41 are connected also to the ends of the arms 48.

Means is provided for automatically shifting the collar 42 to vary the angular relation of the blades according to the speed of the wind so that as the speed of the wind increases the angular relation of the blades to the direction of the wind will be reduced and thus keep the speed of the mill substantially constant.

A slip ring 50 is supported in a groove formed in the collar 42. The slip ring 50 is secured by two links 51 which are connected to the furcations of one arm of a bell crank lever 52 which is pivotally supported on the housing 3. The link 51 extends rearwardly and substantially parallel to the shaft 15. The bell crank lever is connected by means of a link 53 to a shell 54 which is supported on a bearing 55 formed on the housing 3. The shell 54 is provided with a boss or sleeve 56 into which the bearing 55 extends. The upper side of the sleeve 56 is provided with a recess into which a finger 57 extends to prevent axial movement of the housing 54. The finger 57 is bolted to the housing 3. Within the shell 54 is located a governor 59 having two governor weights 60, best shown in Fig. 4. The governor weights are preferably made in the form of two semi-circularly formed arms 61 which are located within the flange 62 of the shell 54. They are connected across the axis of the shell 54 by means of a spring 63 which tends to draw the weights 60 inwardly with respect to the shell 54. The arms 61 are pivoted to two radially extending arms 64 which are secured to a hub 65. When the hub 65 is rotated the weights 60 are centrifugally forced outward. The arms 61 being formed semi-cylindrically, they press against the flange 62 of the shell 54 and operate as a clutch to frictionally engage the flange 62 and to cause rotation of the shell 54 when the speed of the hub 65 is sufficient to cause the frictional engagement. When the shell 54 is rotated it will cause the link 53 to draw the bell crank lever 52 which will forwardly push the rings 50 and 42 so as to push the ends of the arms 40 and cause rotation of the shafts 35. This will cause the angular displacement of the blades 25 from their normal positions in which the springs 38 tend to retain them, which will occur when the speed of the hub 65 is sufficient to cause the frictional engagement of the arms 61 with the flange 62 of the shell 54.

The hub 65 is keyed to a shaft 70. The shaft 70 is driven by the main shaft 15 of the windmill. The shafts 70 and 15 are connected together by rate increasing gear wheels 71, 72, 73 and 74. The gear wheels 72 and 73 are supported in the housing 3 on a shaft 75 and are keyed together. In this way the governor 59 is operated by the speed of the main shaft 15 of the windmill so that when the windmill increases its rate of rotation to above a certain point, that is, when it is sufficient to cause the arms 61 to operate against the yielding tension spring 63 so as to engage the flange 62 of the housing 54 the blades 25 of the windmill will be changed in their angular relation.

The springs 38 and the governor 59 operate to pull in opposite directions, that is, to say the governor operates against the springs 38 so as to take up any slack that may occur in any of the points of the connecting mechanism. Also, the blades are so supported in their respective pivots that the pressure of the wind thereon will be balanced with respect to the axis of the blades. This will necessitate that the axes of the blades shall be slightly advanced beyond the center line of the blades.

A generator 80 is connected to the shaft 70 and its armature rotates at the required speed within the fields of the generator so as to produce the current. The armature of the generator thus being connected to the governor 59, its speed will be, when in operation, kept substantially constant by the automatic control of the blades of the windmill, for as the rotation of the armature rises above a certain rate the blades will be shifted angularly so as to reduce the angular relation of the blades to the direction of the wind that is, the blades will be brought so that their leading edges will advance toward the line of direction of the wind.

The generator is provided with suitable brushes. They make connection with the binding posts 81 and 82. The binding posts 81 and 82 are connected with the storage battery 83 by means of wires 84 and 85 which are connected to contact rings 86 and 87 respectively. The contact rings 86 and 87 are supported on a bushing 88 of insulating material which is in turn supported on a depending sleeve 89 which is secured at its upper end to the housing 3 and rotates with the housing in response to the operations of the rudder 5. Spring pressed contacts 90 and 91 are insulatingly supported on a post 2 of the windmill tower. The storage battery 83 is connected to the spring pressed contacts 90 and 91. In the circuit of the storage battery and generator and particularly in the connection 85, is located a circuit breaker having a contact 95 insulatingly supported on the link 53 and also the contact 96 insulatingly supported on the housing 3. When the speed of the generator rises above a certain rate, the contacts 95 and 96 are closed thereby connecting the generator with the storage battery. The generator will then charge the storage battery, provided the speed of the windmill is such as to cause the contacts 95 and 96 to close by the operation of the governor 59 which turns the housing 54 so as to raise the link 53 so as to close the contacts 95 and 96 and thus complete the circuit of the generator when the speed of the windmill is sufficient to produce in the generator the required electromotive force. If the speed of the windmill continues to increase, the housing 54 will be turned further about its axis and will cause a shifting of the blades 25 in their angular relation with respect to the direction of the wind. This will reduce or maintain a substantially constant speed of the generator shaft 70. To allow for movement of the link 53, the contact 96 is made yielding.

The binding post 81 is connected to a movable contact 100 which is insulatingly supported on a lever 101. The lever 101 is supported on a bracket 102 which is secured to the housing 3. The contact 100 is adapted to make contact with a fixed contact 103 which is insulatingly supported on the bracket 102. The contact 103 is connected to a solenoid 104 which is also supported on a bracket 105 that is secured to the housing 3. The solenoid 104 is connected by a wire 106 which is completed through a contact ring 107 supported on the bushing of insulating material 88 and through the spring pressed contact 108. The spring pressed contact 108 is connected to an amperehour meter 109 and particularly to the contact 110. The amperehour meter 109 is provided with a movable contact 111 which is electromagnetically operated and connected with the storage battery 83 so that when the electricity stored in the storage battery 83 rises or falls above or below a certain point the contact 111 will complete a connection, either with the contact 110 or with the contact 112. If the contact 111 is in contact with the contact 110 by reason of the fact that the battery 83 is fully charged, the circuit will be completed to the storage battery through the contact 111. This will cause the solenoid 104 to operate which will energize it. The solenoid is provided with a two-part core, best shown in Fig. 3, the part 115 being formed of magnetic material, while the part 116 is formed of non-magnetic material. This will operate to suck in the part 115 and push the lever 101 away from the solenoid 104. The lever 101 is provided with a plate 109 against which the part 116 kicks when the solenoid is energized. It acts as a shoe to help keep the core in a potential or operative position.

The main shaft 15 is provided with a bevel gear 117 at the rear end thereof. A second bevel gear 118 meshes with the bevel gear 117 and is provided with a pin 119. The bevel gear 118 is supported on a shaft or pin 120 which is secured in a frame 121 by means of a key bolt 124. The frame 121 may be secured to the housing 3 or made integral with the housing 3. The bevel gear wheels 117 and 118 rotate with the shaft 15 so that when the lever 101 is pushed away from the solenoid 104 the pin 119 operates to push the lever 101 forwardly and so as to be engaged by a catch 125 which is pivotally supported on ears 126 formed on the housing 3. The end of the lever 101 is then engaged by the catch 125 and is held in the position to which it is pushed by the pin 119. The lever 101 is provided with an insulatingly supported contact 127 which is also connected with the binding post 81 of the generator. The contact 127, when the lever 101 is carried forward, makes contact with a yielding contact 128 which is insulatingly supported on the housing 3. The contact 128 is connected to the solenoid 129. When the lever 101 is carried forward, the contacts 100 and 103 are separated, and the connection to the generator 80 is completed through the contacts 127, 128, the solenoid 129, the connection 130, the insulated ring 131, which is supported on the bushing of insulating material 88, the spring pressed contact 132 which makes contact with the ring 132 and is connected to the contact 112 of the amperehour meter. When the lever 101 is carried forward by the pin 119 the link 51 which extends parallel to the shaft 15 and is connected to the lever 101, the slip ring 50 and the ring 42, the links 41 and the arms 40 are pushed forward, pushing the blade of the windmill so as to turn them that the angle between their direction and the direction of the wind is reduced substantially to zero, that is, bringing their planes against the operation of the springs into the direction of the wind. This will prevent the rotation of the windmill and consequently the generator will not be operated until the parts are restored. When the storage battery 83 is discharged sufficiently to cause the contact 111 to make contact with the contact 112 by the use of the electricity stored in the storage battery, the circuit is completed through the contact 111 to the storage battery. This causes the solenoid 129 to draw in its core 135 which is connected to the catch 125. This causes the catch 125 to liberate the lever 101 and to fall back against the stop 139 by its own weight so as to complete the connection to the amperehour meter and particularly to the contact 110 through the line 106, the magnet 104 and the contacts 100 and 103. At the same time the lever 101 falls away from the face of the gear wheel 118 and out of the path of movement of the pin 119. The blades having been permitted to return to normal, when the windmill rotates by the operation of the wind at a speed sufficient to cause the weights 60 of the governor 59 to cause the arm 61 to engage with the flange 62 to move the link 53 so as to complete the connection through the line 85, the contacts 95 and 96, the storage battery will be charged. The circuit of the solenoid 129 will be again completed when the contact 111 makes contact with the contact 112 which occurs when the storage battery 83 becomes discharged to a certain point in the use of the electricity stored therein, thereupon the battery will again be charged.

The main windmill shaft 15 may be also connected to a reciprocating rod 140 having a swivel joint 141. The reciprocating rod 140 may be used for any suitable mechanical purpose, such as, for operating a pump. The rod 140 is supported in a bearing 142 secured to the lower end of the sleeve 89 located in the top of the tower. The rod 140 may be connected to an eccentric 143. The eccentric 143 may be connected to the main shaft 15 by means of a suitable clutch 144 which is feathered onto the shaft 15. The clutch member 144 may be connected by means of a slip ring to a lever 145 which is pivoted on a bracket 146, that is, secured to the housing 3. When the clutch member 144 is shifted along the main shaft 15 connection is established between the eccentric 143 and the main shaft 15. The windmill will then operate the reciprocating rod 140 for any desired purpose.

The construction selected and described may be greatly varied in the arrangement and manufacture of its parts and in the substitution of elements having equivalent functions and such modifications may be used for many varied purposes and still contain the invention.

Having thus described my invention, what I claim as new, and desire to secure by Letters Patent, is,—

1. In a windmill-generator set, the combination of speed gears located intermediate the windmill and the generator for driving the generator, an automatic clutch located on the generator shaft for completing the circuit of the generator when the speed of the generator shaft rises above a certain point, the blades of the windmill rotatable about a line extending through the planes of the blades, and means connected to the automatic clutch for varying the angular relation of the blades to the direction of the wind.

2. In a windmill-generator set, the combination of an electromagnetic means connected to the generator and means operated by the rotation of the windmill for placing the windmill out of operative relation with respect to the wind and controlled by the electromagnetic means.

3. In a windmill generator set, the combination of a storage battery, an amperehour meter, the generator connected to the storage battery and the amperehour meter, the amperehour meter adapted to complete the circuit with the storage battery, electromagnetic means connected to the amperehour meter for placing the windmill out of operative relation with respect to the wind, a second electromagnetic means for permitting the windmill to return to an operative relation with respect to the wind, means controlled by the rotation of the windmill for coacting with the first-named magnet to place the windmill out of operative relation with respect to the wind.

4. In a windmill generator set, the combination of an automatic clutch connected to the generator, speed gear wheels located intermediate the shaft of the generator and the shaft of the windmill, a circuit closer located in the circuit of the generator and closed by the operation of the clutch, and a means for controlling the speed of the windmill operated by the said automatic clutch.

5. In a windmill-generator set, the combination of a generator, automatic means connected to the shaft of the generator, speed gear wheels connecting the shaft of the generator and the shaft of the windmill, a circuit closer and an automatic means for operating the circuit closer when the speed of the windmill reaches a certain point, and means for controlling the speed of the windmill according to the speed of the wind.

6. In a windmill generator set, the combination of a generator, a windmill, a rim and a ring, the blades of the windmill pivoted in the rim and pivotally connected to the ring at their outer ends, said ring movable with respect to the shaft of the windmill, a rod pivoted in the rim and connected to one of the blades for moving the blades of the windmill angularly with respect to the direction of the wind to produce uniform speed of the shaft of the windmill, a friction clutch connected to the shaft of the generator and operated by the speed of the generator, links connecting the friction clutch with a rod, and means for connecting the armature of the generator with the shaft of the windmill.

7. In a wind-mill generator set, a generator connected to the shaft of the wind-mill, a storage battery connected to the generator, an automatic clutch connected to the shaft of the generator, a switch member movable a short angular distance by the operation of the clutch for completing the circuit of the generator and the storage battery, blades mounted for angular rotation, and means for operating the blades relative to the shaft of the wind-mill according to the speed of the wind-mill.

8. In a wind-mill generator set, the combination of a generator, a storage battery connected to the generator, an automatic clutch located on the shaft of the generator, a member movable a short angular distance by the operation of the clutch, blades mounted for angular rotation and rotated by the said member, speed gear wheels located intermediate the main shaft of the wind-mill and the generator shaft for producing a potential at the generator above the counter electro-motive force of the battery.

9. In a windmill generator set, the combination of a generator, a storage battery connected to the generator, an automatic clutch located on the shaft of the generator, a member movable a short angular distance by the operation of the clutch, blades mounted for angular rotation and rotated by the said member, and means connecting the generator shaft with the shaft of the windmill.

10. In a windmill generator set, the combination of a generator and a windmill, means for connecting the shafts of the windmill and the generator for driving the generator, an automatic clutch located on the generator shaft for completing the circuit of the generator when the speed of the generator shaft rises above a certain point, the blades of the windmill rotatable about lines parallel to the planes of the blades, and means connected to the automatic clutch for varying the angular relation of the blades to the direction of the wind.

11. In a windmill generator set, the combination of a storage battery, an amperehour meter, the generator connected to the storage battery and the amperehour meter adapted to complete the circuit with the storage battery, means operated by the wind-mill to place the windmill out of operative relation with respect to the wind, an electromagnet connected to the amperehour meter for controlling the said means, a second electromagnet for restoring the said means to permit the windmill to return to operative relation with respect to the wind.

In testimony whereof, I have hereunto signed my name to this specification.

FRED J. FAHLE.